Nov. 13, 1962    M. ALIMANESTIANO    3,063,579
VEHICLE PARKING SYSTEM
Filed Oct. 6, 1958    6 Sheets-Sheet 1

INVENTOR.
Mihai Alimanestiano
BY
ATTORNEY

Nov. 13, 1962  M. ALIMANESTIANO  3,063,579
VEHICLE PARKING SYSTEM
Filed Oct. 6, 1958  6 Sheets-Sheet 2

INVENTOR.
Mihai Alimanestiano
BY
ATTORNEY

Nov. 13, 1962     M. ALIMANESTIANO     3,063,579

VEHICLE PARKING SYSTEM

Filed Oct. 6, 1958     6 Sheets-Sheet 3

*INVENTOR.*
Mihai Alimanestiano

BY

ATTORNEY

United States Patent Office 3,063,579
Patented Nov. 13, 1962

3,063,579
VEHICLE PARKING SYSTEM
Mihai Alimanestiano, Nyack, N.Y., assignor to Speed-Park, Inc., New York, N.Y., a corporation of New York
Filed Oct. 6, 1958, Ser. No. 765,584
4 Claims. (Cl. 214—16.1)

This invention relates to a vehicle parking system; and more specifically, concerns parking systems of the type wherein vehicles are parked in tiered sets of stalls serviced by a transfer mechanism, the transfer mechanism having movement longitudinally and adapted to transfer vehicles to and from stalls on either side of the path of movement of the transfer mechanism.

In copending application Ser. No. 630,219, filed December 24, 1956, now Patent 2,915,204, there is disclosed transfer mechanism movable in a longitudinal path and adapted to transfer vehicles to and from a single set of parking stalls located immediately adjacent said path on one or both sides of said path; the parked vehicles being disposed in their stalls parallel to said path. Thus, the transfer mechanism can only serve a single set of stalls on either side of its path of movement.

To increase the capacity of this type of parking system by the addition of one or two additional sets of stalls, a second transfer mechanism is required to service the third, or the third and fourth sets of stalls. Assuming a stall width of 8' and 8' for the path of movement of the transfer mechanism, a two stall arrangement would require a garage width of about 24' plus about 3' for footwalks and door clearance at the point of delivery of the vehicle to the transfer mechanism.

For a three stall arrangement, the additional transfer mechanism, increases the garage width requirement to about 40' plus about 4–5' for footwalks and door clearance. With a four stall arrangement, the garage width requirement increases to about 48' plus the footwalk requirement.

It will be apparent that to increase the capacity of a parking garage of the type set forth in said Patent 2,915,204, to include a third, or a third and fourth set of stalls, not only involves the cost of an additional transfer mechanism, but also necessitates the finding of property of adequate frontage to accommodate the very substantial width requirements noted above. In congested urban areas, property widths are usually quite limited and in many cases, the unavailability of the property having the necessary frontage requirements, precludes the construction of a three or four stall type of garage.

Accordingly, an object of this invention is to provide an improved vehicle parking system wherein a single transfer mechanism is adapted to service 1, 2, 3, 4 or more sets of stalls; the stalls being arranged in any desired combination relative to one or both sides of the path of movement of the transfer mechanism. Thus, there may be a single set of stalls on one side of said path; a single set of stalls on either side of the path; a single set of stalls on one side and two sets of stalls on the other side of the path; or two sets of stalls on either side of the path, and so on.

In parking systems of the type disclosed in said Patent 2,915,204, a two stall arrangement requires location of the path of the transfer mechanism between the sets of stalls, thus requiring a garage frontage of about 24' plus about 3' additional for footwalk and door clearance. Another object of this invention is to provide an improved vehicle parking system wherein the single transfer mechanism is adapted to service two sets of stalls located on one side of the path of movement of the transfer mechanism, whereby no extra allowance for footwalk or door clearance is required, thereby permitting the use of a frontage of about 24'. Since property in urban business areas rarely exceed 25' per lot, the system of the instant invention allows the use of such city lots for a two stall arrangement parking garage.

Another object of this invention is to provide an improved vehicle parking system including a transfer mechanism having load receiving fingers movable laterally for interdigitating relation with load receiving members located immediately adjacent the path of movement of the transfer mechanism, or load receiving members located more remotely from said path of movement, thereby allowing the single transfer mechanism to service one, two or more sets of parking stalls on a single side of said path of movement.

Still another object of this invention is to provide an improved vehicle parking system of the character described, wherein the load receiving fingers of the transfer mechanism are supported throughout their projected movement for interdigitation with the load receiving members in the parking stalls.

Still a further object of this invention is to provide in a parking system of the character described, transfer mechanism of the comb type wherein the fingers thereof are selectively operable for limited or extended movement into interdigitating relation with proximal or distal sets of load receiving members relative to the path of movement of the transfer mechanism.

Yet another object of this invention is to provide for use with a transfer mechanism having at least one transfer member arranged for projected and retracted movement, improved means for effecting such projected and retracted movement to points of varying distance.

Yet a further object of this invention is to provide an improved transfer mechanism having a transfer member of the comb type wherein the fingers thereof are projected for interdigitation with fixed load receiving members and including improved means for effecting the transfer of a load between said fingers and said load receiving members.

Other objects of this invention will in part be obvious and in part hereinafter pointed out.

In the copending application Ser. No. 630,219, there is described a vehicle parking system including a transfer mechanism having a pair of comb type transfer members arranged for relative vertical displacement and horizontal movement in opposite directions, respectively. This permits a vehicle to be picked up on the fingers of one transfer member upon projected movement of such transfer member into a loading zone, followed by retraction of the transfer member; movement of the transfer mechanism to the proper tier of parking stalls where the mechanism may be raised to the proper level by elevator means, followed by relative vertical displacement of the transfer members and projected horizontal movement of the uppermost member to the right or left, as required. In the stalls, which are disposed immediately adjacent the path of movement of the transfer mechanism, fixed, parallel load receiving members receive the fingers of the projected transfer member and the vehicle is transferred from the fingers to the load receiving members.

The foregoing operation is reversed to bring a parked vehicle from its parking stall to the unloading zone. The single transfer mechanism thus services either a single set of parking stalls on one side of its path of movement or a single set of stalls on each side of said path of movement.

The instant invention, constituting an improvement on the invention of said copending application, comprises as one feature thereof, an arrangement wherein a single transfer mechanism is adapted to service one, two or more sets of laterally adjacent stalls on either side of its path of movement; the mechanism including at least one comb type transfer member arranged for projection selectively to interdigitate the fingers thereof with the proximal or distal sets of load receiving members in said laterally related sets of stalls, to effect the transfer of a vehicle to and from said stalls.

Figure 1:
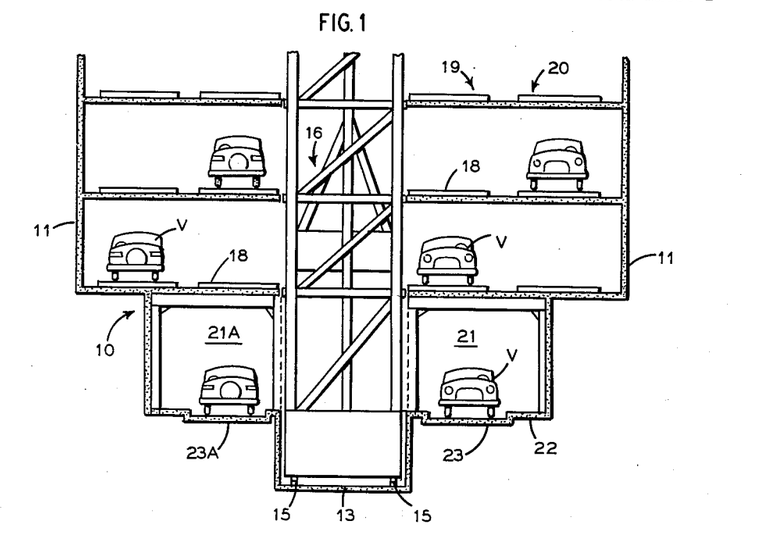
FIG. 1 is a front elevational view of a garage embodying the parking system of the instant invention.
Figure 2:
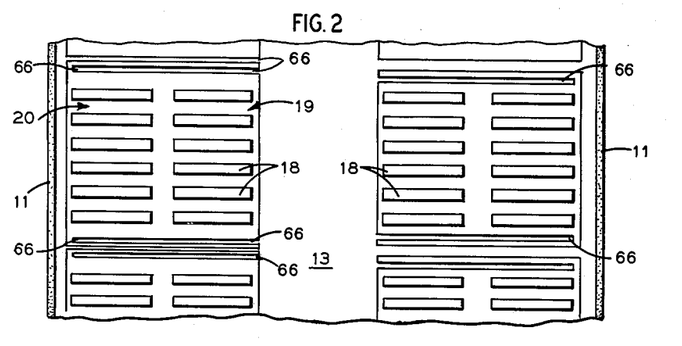
FIG. 2 is a top plan view of a portion of the parking stalls thereof.

For the purpose of illustration, FIGS. 1 and 2 show the instant invention, as the same is applied to a parking garage having a single transfer mechanism adapted to service two sets of laterally related stalls on each side of the path of movement of the transfer mechanism; it being understood that more than two sets of stalls may be located on one or both sides of said path of movement.

As shown in FIG. 1, 10 designates a garage structure having parallel outer walls 11 from which extend at successively higher horizontal levels, opposed floor structures 12, providing a longitudinal passageway therebetween as at 13. Since the garage is of the multifloor type, a tower 14 moves in passageway 13, on rails 15, through means not shown, and in a manner known in the art. Tower 14 carries an elevator 16, which in turn supports the transfer mechanism generally designated at 17.

The mechanism 17 is adapted to transfer vehicles to and from fixed, parallel, elongated load receiving members 18 located on floor structures 12 and extending transversely of passageway 13. As shown in FIGS. 1 and 2, one set of members 18 are located immediately adjacent passageway 13 to provide inner stalls 19, while other sets of members 18 are located remotely from said passageway to provide outer stalls 20. This arrangement is repeated along the length of said floor structures 12 to provide longitudinally disposed, vertical tiers of inner and outer parking stalls.

The members 18 of each inner stall 19 are respectively longitudinally aligned with the members 18 of the laterally adjacent outer stall 20. The spaces between members 18 of stalls 19 open on passageway 13 and the spaces between members 18 in stalls 19, 20 are open from the top throughout their length.

Figure 3:
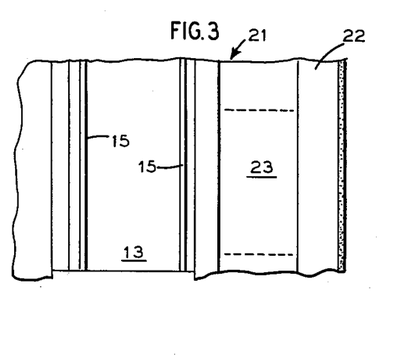
FIG. 3 is a top plan view of the loading and unloading zone thereof.

Vehicle passageways 21, 21a are located on the ground floor of garage 10, on opposite sides of passageway 13 respectively. Such passageways 21, 21a extend the length of the garage, one being used for incoming vehicles V and the other for outgoing vehicles V. Passageways 21, 21a include footwalks 22 and adequate clearance to allow vehicle doors to be opened at the loading zone 23 or unloading zone 23a. An incoming vehicle V is stopped in zone 23 in passageway 21 for pickup by transfer mechanism 17, while an outgoing vehicle is deposited by said transfer mechanism 17 in unloading zone 23a in passageway 21a.

The tower 14 is moved along rails 15 to align the same with zones 23, 23a to properly locate transfer mechanism 17 for its pickup or delivery operation. On picking up a vehicle from loading zone 23, the same is withdrawn into elevator 16 and the tower 14 is then moved along rails 15 to bring it into alignment with a selected vertical tier of stalls, the elevator 16 then rising to the proper level, whereupon the transfer mechanism 17 is then operated to deposit the vehicle on the load receiving members of the selected stall 19 or 20. The mechanism and controls required to actuate and position elevator 16, tower 14 in proper sequence, do not form a part of the instant invention.

Figure 4:
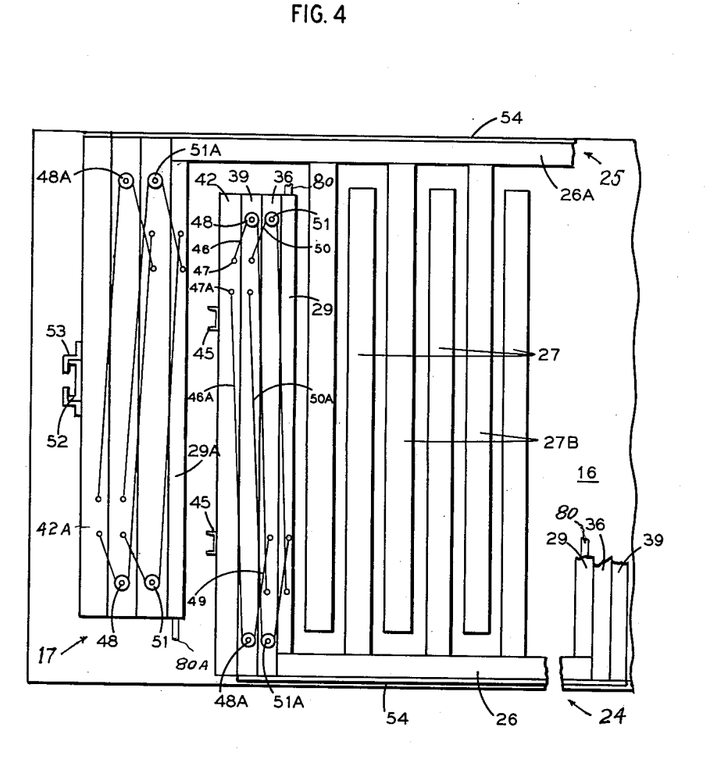
FIG. 4 is a top plan view of the transfer mechanism.
Figure 5:
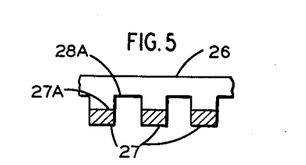
FIG. 5 is a transverse sectional view of a portion thereof.

The transfer mechanism 17 located in elevator 16, comprises essentially, a pair of comb type transfer members 24, 25 having fingers arranged in opposed interdigitated relation when said members are in their rest position on said elevator. Members 24, 25 are arranged for relative vertical displacement, and preferably one of said members is retained against vertical movement while the other member moves to positions above or below the vertically immovable member. However, each of the transfer members 24, 25 is arranged for projected and retracted movement in a horizontal plane, said members being movable in opposite directions. Transfer members 24, 25 are essentially similar, except as hereinafter pointed out. Accordingly, one of said members will be described in detail.

Transfer member 24 is shown as being fixed against vertical movement while transfer member 25 may be moved from a position coplanar with member 24 to positions above or below said member 24. Transfer member 24 comprises essentially a hollow backbone member 26 with a plurality of load carrying fingers 27 extending transversely from member 26. Fingers 27 are secured at their inner ends in downwardly offset relation to member 26 by way of pads 27a, thereby locating the top surfaces 28 of said fingers 27 in depressed relation to the underside 28a of member 26. Such arrangement of fingers 27 relative to member 26 leaves the spaces between the fingers 27 open at the inner ends thereof as well as at the outer ends thereof.

Figure 7:
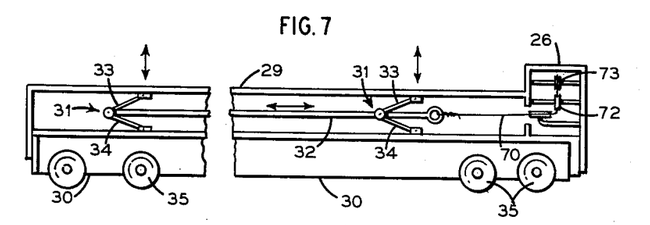
FIG. 7 is a side view of an end portion of the transfer member.

Transfer member 24 further includes at the opposite outer ends thereof, mounting fingers 29 in the form of inverted channel members which extend from backbone member 26, parallel to load carrying fingers 27. Within mounting fingers 29 and telescopically arranged relative thereto are carriage members 30 in the form of inverted channel members. Fingers 29 are connected to carriage members 30 by toggle means 31 which includes an actuating rod 32 extending between fingers 29 and carriage members 30, said rod being pivotally connected to longitudinally spaced sets of arms 33, 34, which in turn are pivotally connected to fingers 29 and members 30, respectively as shown in FIG. 7. Thus, transfer member 24 may be raised or lowered relative to the carriage members 30, upon appropriate movement of rod 32, actuated as hereinafter described. Longitudinally spaced wheels 35 are mounted on carriage members 30, for the purpose hereinafter appearing.

Figure 6:
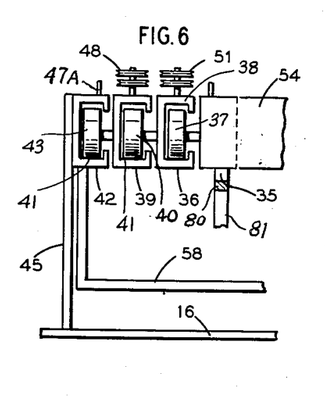
FIG. 6 is a front elevational view of one end of one transfer member.

Transfer member 24 is arranged for projected and retracted movement in a horizontal plane. To this end, member 24 is located between inner, elongated slide members 36 and slidably mounted thereon by means of rollers 37 rotatably mounted on the outer sides of carriage members 30 and received in channel portions 38 of said slide members 36. In turn, inner slide members 36 are slidably mounted on outer, elongated slide members 39 by means of rollers 40 extending from the outer portions of members 36 and received in channel portions 41 of outer slide members 39. Finally, outer slide members 39 are slidably mounted on elongated slide supports 42 by means of rollers 43 extending from outer portions of slide members 39 and received in channeled portions 44 of supports 42, as indicated in FIG. 6.

As transfer member 24 is arranged for horizontal movement only relative to elevator 16, slide supports 42 may be mounted on upstanding brackets 45 fixed to opposite end portions of said elevator.

Means is provided for projecting and retracting transfer member 24 in a horizontal plane, by way of slide members 36, 39 and slide supports 42. To this end, a first cable 46 is anchored at the forward end of slide supports 42, as at 47, passed around a pulley 48 on the forward end of outer slide member 39 and anchored on a rear portion of inner slide member 36, as at 49. A second cable 50 is anchored on a forward end of outer slide member 39, passed around a pulley 51 on the forward end of inner slide member 36 and anchored to a rear portion of mounting finger 29.

Thus, upon projected movement of the outer slide members 39 relative to slide supports 42, cables 46, 50 will be operative to project inner slide members 36 beyond slide members 39, and to project mounting fingers 29 which carry transfer member 24, beyond inner slide members 36.

Transfer member 24 is retracted from its projected positions by cables 46a, 50a which are arranged about anchor point 47a, pulleys 48a, 51a; to reverse the movement of member 24 relative to slide members 36, 39 and supports 42 upon retracted movement of the outer slide members 39.

Transfer member 25 is similar to transfer member 24 except that the member is arranged for vertical movement relative to elevator 16 on uprights 52 fixed to the opposite ends of said elevator and engaged by channel guides 53 on slide supports 42a of transfer member 25. The transfer member 25 may be raised and lowered by means of cables, not shown, extending upwardly to upper portions of the elevator 16, and pulled by motor means, not shown, on said elevator, thus bringing the fingers 27b of the transfer member 25 to positions above or below the fingers 27 of transfer member 24, thus selectively leaving either transfer member 24 or transfer member 25 in the uppermost position for projected and retracted movement towards and away from the parking stalls 19, 20.

Furthermore, the outermost fingers 27b of transfer member 25 are sufficiently spaced inwardly from mounting fingers 29a thereof, to receive therebetween the mounting fingers 29, slide members 36, 39 and slide support 42 on each end of transfer member 24, as shown in FIG. 4. Thus, transfer member 24 may be projected to one side of elevator 16 while transfer member 25 may be projected to the other side of said elevator.

Means is provided for positively projecting and retracting the outer slide members 39, thereby effecting movement of the transfer member 24 in a horizontal plane. To this end, the slide members 39 at the opposite ends of transfer member 24 are interconnected at their rear by an elongated member 54 located rearwardly of backbone member 26. On a midportion of member 54 and on the underside thereof is affixed an inverted channel member 55 extending transversely of the fingers 27. A second inverted channel member 56 is arranged forwardly of member 55 and parallel thereto, by means of a plate 57 extending forwardly of member 54.

A drop bracket 58 is fixed to slide supports 42 at the opposite ends of elevator 16, said bracket extending below the transfer member 24 and supporting on an intermediate portion thereof a gear motor device 59 which rotates a vertical spindle 60 carrying a horizontally disposed radial arm 61. A lever 62 is pivoted to the underside of arm 61, as at 63. Lever 62 has affixed to the opposite ends thereof upstanding studs 64, 65 which pass through openings 64a, 65a respectively in arm 61.

When transfer member 24 is in its fully retracted position, arm 61 extends parallel to fingers 27 and locates studs 64, 65 in alignment with channel members 55, 56 respectively. Lever 62 may be pivoted by suitable means, not shown, such as a solenoid or the like, to selectively bring stud 64 into operative engagement with channel member 55, or stud 65 into engagement with channel member 56.

Thus, upon engagement of channel member 55 by stud 64 and operation of gear motor 59, rotation of arm 61 through 180° will fully project outer slide members 39 and thereby fully project transfer member 24. Further rotation of arm 61 will retract the transfer member to its original position. Upon pivoting lever 62 so as to bring stud 65 into engagement with channel member 56, the effective length of arm 61 is reduced, thereby shortening the extent of the projected movement of transfer member 24, but otherwise operating in the manner previously described.

It is understood that transfer member 25 is similarly provided with a gear motor device 59 and the associated elements for effecting full and partially projected movement of said transfer member in the opposite direction, as well as retracting the same, in the manner described above.

Assuming that a vehicle V is in the loading zone 23 of vehicle passageway 21 and is to be parked. Tower 14 will move on rails 15 to bring elevator 16 into lateral alignment with said loading zone 23 and device 59 will be operated to partially project transfer member 24 to pick up said vehicle and to carry the same on fingers 27 thereof into elevator 16.

The tower 14 is then moved to position the same with the proper tier of stalls along passageway 13 and elevator 16 will be raised to the proper floor level 12 which contains an unoccupied stall for receiving the vehicle. The movements of the tower 14 and elevator 16 are controlled by means, not shown, which do not from a part of the instant invention. When elevator 16 has been levelled with the selected floor 12, transfer member 24 or transfer member 25 is brought to the uppermost position, depending on whether the vacant stall is on one side or the other of elevator 16; this being accomplished by raising or lowering transfer member 25 relative to transfer member 24.

The appropriate transfer member is then projected through operation of its gear motor 59; the projected transfer member being supported throughout its movement by wheels 35 which move in guide grooves 66 formed in floor structures 12 at opposite ends of each stall, thereby allowing the transfer member and the vehicle carried thereby to be supported by said floor structure. If the vehicle is to be deposited in an outer stall 20, then the transfer member is fully projected, whereas if an inner stall 19 is to be occupied by said vehicle, the transfer member is only partially projected, through appropriate operation of lever 62.

Figure 13:
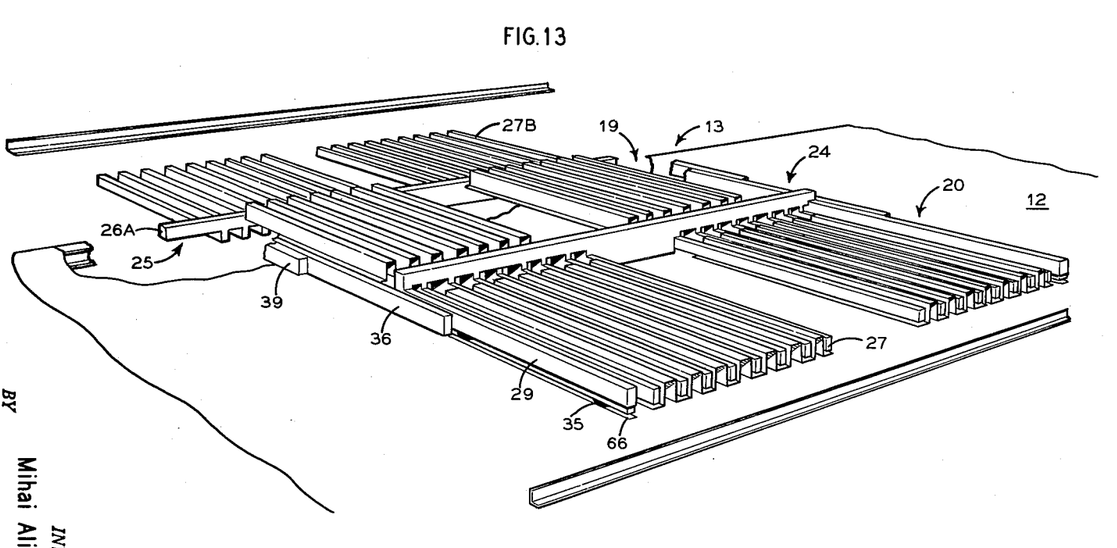
FIG. 13 is a view similar to that of FIG. 12 showing the fingers in lowered relation to the load receiving members.

As backbone member 26 is elevated relative to fingers 27, 27b, the spaces between said fingers are open at the opposite ends thereof, thus allowing free projected movement of the transfer members 24, 25 as the same move over the floor structures 12 to allow interdigitation of said fingers with the load receiving members 18 of the outer stalls 20 as well as the inner stalls 19, as shown in FIG. 13.

Figures 8, 9, 10, 16:
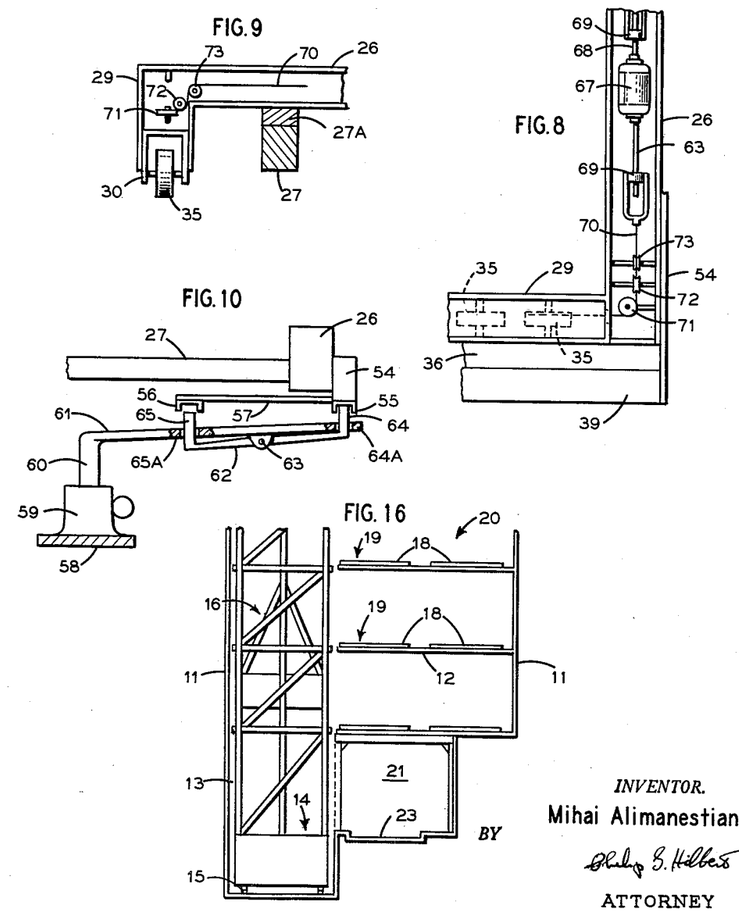
FIG. 8 is a top plan view thereof.
FIG. 9 is a transverse view thereof.
FIG. 10 is a side elevational view of the actuating mechanism for one transfer member.
FIG. 16 a front elevational view similar to that of FIG. 1, showing a double set of laterally related parking stalls on one side of the path of the transfer mechanism.
Figure 11:
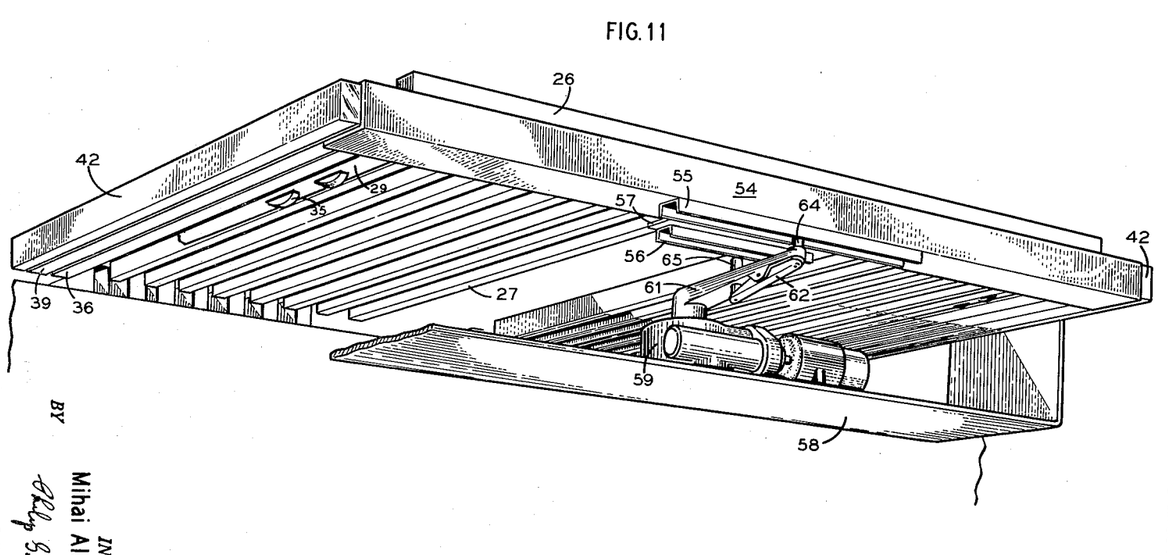
FIG. 11 is a perspective view showing the underside of one transfer member and its actuating mechanism.

When a vehicle V is received on the fingers of either of the transfer members 24, 25, the fingers are raised in relation to the carriage members 30. The elevation of the fingers and associated backbone member 26 is accomplished by moving actuating rod 32 to the right, looking at FIG. 7, by means of a gear motor 67 located within the backbone member 26 at a midpoint thereof. The motor 67 includes oppositely extending rotatable lead screws 68 on which nuts 69 travel. Cables 70 interconnect the rear end of rods 32 on either end of the transfer members, with nuts 69; the cables passing about a pulley 71 and then about pulleys 72, 73 to brackets 74 on nuts 69, as shown in FIGS. 7–9.

Lead screws 68 have their threads arranged in a manner whereby rotation of motor 67 in one direction pulls on cables 70 to actuate the toggle connections between carriages 30 and mounting fingers 29 of the transfer member, effecting a lift of the transfer member.

Figure 12:
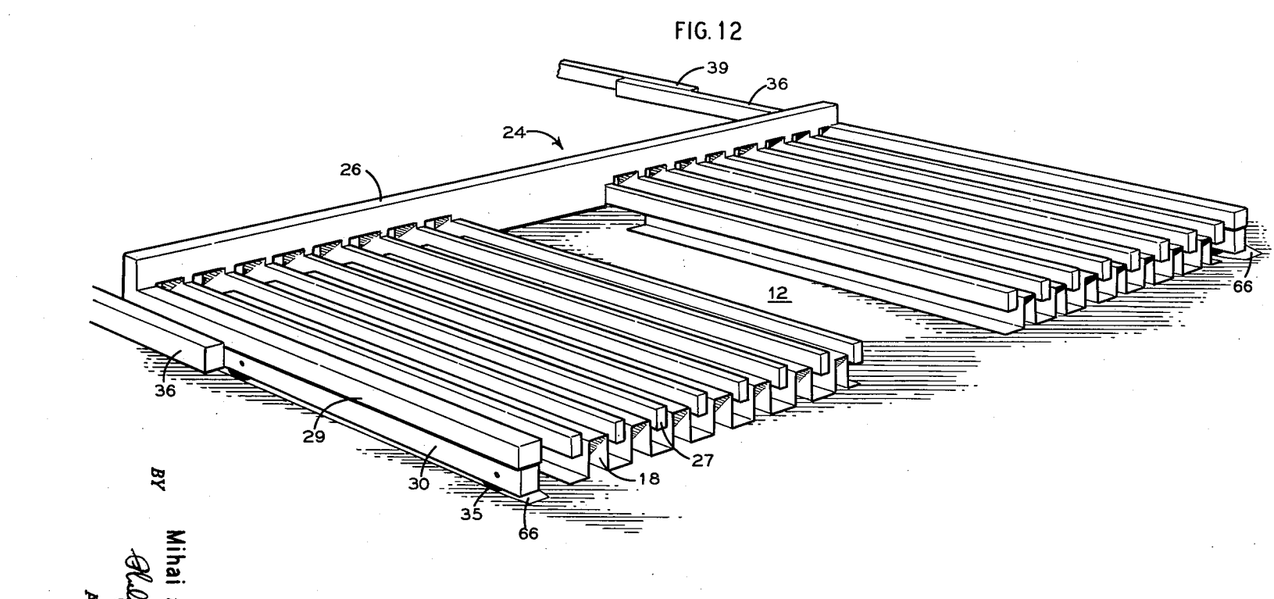
FIG. 12 is a perspective view of the upper side of the transfer member showing the same in projected position with the fingers thereof in raised relation to the load receiving members.

Thus, as transfer member 24 is projected to interdigitate fingers 27 thereof with load receiving members 18, the top surfaces of fingers 27 will be slightly elevated relative to the top surfaces of members 18, as shown in FIG. 12. When the transfer member has been projected to its proper position in relation to the selected stall 19 or 20, the gear motor 67 is rotated in the opposite direction to reverse the rotation of lead screws 68, thereby permitting the weight of the transfer member plus that of the vehicle carried on its fingers, to depress the fingers to positions below the load receiving members 18, as shown in FIG. 13. Accordingly, the vehicle V will be transferred to said load receiving members 18 and the transfer member may now be retracted by operation of gear motor 59.

It is understood that to transfer a vehicle V to the opposite side of passageway 13 for parking in a stall 19 or 20, transfer member 25 will be used, the same being operated in the manner previously described. In this case, transfer member 25 will be raised above the inactive transfer member 24, thus allowing member 25 to be projected and retracted.

Figure 14:
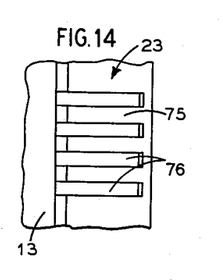
FIG. 14 is a top plan view of one form of loading zone in the vehicle passageway.
Figure 15:
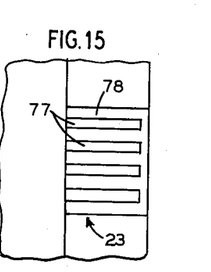
FIG. 15 is a top plan view showing an alternative form of loading zone.

The pickup zone 23 may be formed in a manner to facilitate the pickup of vehicle V by transfer member 24, as indicated in FIGS. 14, 15. Thus as shown in FIG. 14, the passageway floor at zone 23 may be cut out to form stationary fingers 75 which form parallel spaces opening on passageway 13. Such spaces are filled by parallel members 76 of a unitary grid which is vertically movable to permit said grid to be depressed below the level of fingers 75, to allow fingers 27 of transfer member 24 to enter the spaces between fingers 75, locating fingers 27 under the wheels of the vehicle V in zone 23.

Alternatively, as shown in FIG. 15, zone 23 is made up of fixed parallel members 77 coplanar with the passageway floor while a section of said passageway floor takes the form of a unitary grid made up of parallel members 78 which are in interdigitated relation to fixed members 77. The grid may be lowered so as to depress members 78 thereof, whereby the spaces between members 77 are open to receive fingers 27 of transfer member 24 as the same is projected into passageway 21. It is understood that suitable means, not shown, is provided for raising and lowering the grid structures.

The transfer member 24 may be further supported while on elevator 16, by means of rails 80 mounted on upstanding brackets 81 on said elevator, as shown in FIGS. 4, 6. Wheels 35 move over said rails 80, which terminate at their forward ends just short of backbone member 26a of transfer member 25, as transfer member 24 is projected and retracted. Transfer member 25 may be similarly supported, except that rails 80a are mounted on the slide supports 42a of said transfer member, by bracket means not shown, to allow for conjoint vertical movement of rails 80a with slide supports 42a.

The parking system of the instant invention is particularly applicable to garages having a frontage width for only two sets of stalls. Thus, as shown in FIG. 16, the stalls 19, 20 are disposed on one side of the path of movement of transfer mechanism 17, which is operative to transfer a vehicle V to and from an inner stall 19 or an outer stall 20, as previously described.

It will be noted that with the arrangement shown in FIG. 16, the passageway 21, which has a width of about 8′ plus 4 to 5′ for footwalk and door clearance, is accommodated within the 16′ requirement for the laterally related stalls 19, 20; thus permitting such a garage to be built on a maximum frontage of about 24 to 25′, whereas a two stall garage having the transfer mechanism between the stalls, would require a frontage of at least 28′, including the footwalk and door clearance requirement.

It will be apparent that with the vehicle parking system of the instant invention, a single transfer mechanism can service, one, two, or more, laterally related sets of stalls on one or both sides of the path of movement of a single transfer mechanism; thereby effecting savings in the cost of installation of the system, and further, minimizing the property frontage requirements for a garage of a given number of sets of stalls.

As various changes might be made in the embodiments of the invention herein disclosed without departing from the spirit thereof, it is understood that all matter shown or described herein is deemed illustrative and not limiting except as set forth in the appended claims.

Having thus disclosed my invention, I claim as new and desire to protect by Letters Patent:

1. In a vehicle parking garage having elevator means movable in a rectilinear path, parking stalls on at least one side of said path, said stalls including a first set of stalls located immediately adjacent said path of movement and a second set of stalls laterally related to said first set of stalls and remote from said path of movement, parallel load receiving members in each set of stalls extending transversely of said path of movement, the load receiving members in the respective sets of stalls being in respective longitudinal alignment to provide continuous longitudinal spaces therebetween, said elevator means including transfer means comprising a set of parallel fingers and a backbone member interconnecting said fingers at one end thereof and on upper surface portions thereof to provide continuous longitudinal spaces between adjacent fingers open at the opposite ends thereof and open on the undersides thereof throughout the length thereof, the underside portions of said backbone between adjacent fingers being spaced above the top surfaces of said fingers, means for projecting said transfer means in a single horizontal plane to interdigitate the fingers thereof with said load receiving members, means for raising and lowering said transfer means while the fingers thereof are in interdigitated relation with said load receiving members whereby the top surfaces of said fingers are disposed above or below the top surfaces of said load receiving members, and means for controlling the operation of said projecting means to selectively locate said transfer means with the fingers thereof in interdigitated relation to the load receiving members of the first set of stalls or the load receiving members of the second set of stalls.

2. In a vehicle parking garage, a transfer mechanism carrying structure movable in a pasageway extending longitudinally of the garage, a floor structure adjacent said passageway comprising a first parking stall opening on said passageway and a second stall laterally adjacent said first stall and remote from said passageway, parallel, elongated load receiving members on said floor structure in each stall, said members extending transversely of said passageway, members in one stall being aligned longitudinally with respective members in the other stall, transfer mechanism on said carrying structure, said mechanism comprising a comblike element arranged for horizontal movement toward and away from said stalls, said element including parallel teeth and a backbone interconnecting said teeth at one end thereof, said backbone being secured to the upper face portions of said teeth in vertically dispalced relation thereto to locate the undersurface portions of said backbone between adjacent fingers above the top surfaces of said fingers and to provide continuous longitudinal spaces between adjacent teeth open at the opposite ends thereof and on the undersides thereof throughout the length thereof, means for moving said comblike element over said floor structure while in supported engagement with said floor structure to locate the teeth of said element in interdigitating relation to said load receiving members, means for controlling the element moving means for selective disposition of the teeth with the load receiving members of said first and second stalls, and means for raising and lowering the teeth of said comblike element relative to said floor structure to elevate and depress the upper surfaces of said teeth relative to the upper surfaces of said load receiving members.

3. Vehicle transfer mechanism comprising a base, a pair of parallel slide supports on said base, a transfer member between said slide supports, slide means slidably interconnecting said transfer member with said supports to allow for horizontal projected and retracted movement thereof on one side only of said base, means connecting said transfer member and said slide means for projecting and retracting said transfer member relative to said slide means upon movement of said slide means, and means for projecting and retracting said slide means relative to said slide supports, said last mentioned means comprising a member rotatable about a vertical axis, an arm extending radially from said rotatable member for movement in a horizontal plane, and means operatively connecting the outer end of said radial arm with said slide means for projecting and retracting said slide means upon rotation of said rotatable member, said transfer member comprising a plurality of parallel fingers having coplanar upper surfaces, a member interconnecting said fingers at the inner ends thereof, said member being disposed with the lower surface thereof in opposed relation to the upper surfaces of said fingers whereby said fingers are open at the opposite ends thereof and the underside thereof throughout the length thereof.

4. In a vehicle transfer mechanism comprising a pair of laterally related slide supports, a pair of slide means respectively slidably mounted on said supports, a transfer member between said slide means, means for slidably mounting said transfer member on said slide means, means operative to project and retract the transfer member relative to said slide means upon projected or retracted movement of said slide means, means for projecting or retracting said slide means comprising a member rotatable about a vertical axis, a radial arm fixed on the inner end thereof to said rotatable member for movement in a horizontal plane, an elongated inverted channel member mounted on the underside of said slide means, upstanding means on said radial arm receivable in said channel member for imparting rectilinear projected and retracted movement to said slide means upon rotation of said radial arm, a second channel member on said slide means mounted in parallel relation to said first channel member, and second means on said radial arm receivable in said second channel member for imparting rectilinear movement to said slide means upon rotation of said radial arm, the radial distance to said second means being less than that of said first means.

References Cited in the file of this patent

UNITED STATES PATENTS

| | | |
|---|---|---|
| 493,542 | Bessing et al. | Mar. 14, 1893 |
| 1,676,449 | Lederer | July 10, 1928 |
| 1,973,605 | Buettell et al. | Sept. 11, 1934 |
| 2,073,721 | Wheelock | Mar. 16, 1937 |
| 2,168,527 | Iversen | Aug. 8, 1939 |
| 2,707,054 | Alimanestiano | Apr. 26, 1955 |
| 2,815,849 | Zumbrunnen | Dec. 10, 1957 |
| 2,828,027 | Stevenson et al. | Mar. 25, 1958 |
| 2,838,186 | Alimanestiano | June 10, 1958 |
| 2,845,189 | Sanders | July 29, 1958 |
| 2,858,032 | Morley | Oct. 28, 1958 |
| 2,915,204 | Alimanestiano | Dec. 1, 1959 |
| 2,945,602 | Kroll et al. | July 19, 1960 |

FOREIGN PATENTS

| | | |
|---|---|---|
| 165,872 | Australia | July 23, 1953 |
| 337,726 | Great Britain | Oct. 28, 1930 |